(12) United States Patent
Brasseur

(10) Patent No.: US 12,240,030 B2
(45) Date of Patent: Mar. 4, 2025

(54) METHOD FOR THE PRODUCTION OF A PLATE HEAT EXCHANGER

(71) Applicant: Olivier Brasseur, Dorsten (DE)

(72) Inventor: Olivier Brasseur, Dorsten (DE)

( * ) Notice: Subject to any disclaimer, the term of this patent is extended or adjusted under 35 U.S.C. 154(b) by 0 days.

(21) Appl. No.: 18/409,079

(22) Filed: Jan. 10, 2024

(65) Prior Publication Data
US 2024/0238864 A1 Jul. 18, 2024

(30) Foreign Application Priority Data

Jan. 12, 2023 (EP) ..................................... 23151285

(51) Int. Cl.
*B21D 53/04* (2006.01)

(52) U.S. Cl.
CPC ......... *B21D 53/04* (2013.01); *Y10T 29/49366* (2015.01); *Y10T 29/49393* (2015.01)

(58) Field of Classification Search
CPC ............... B23P 15/26; Y10T 29/49366; Y10T 29/49393
See application file for complete search history.

(56) References Cited

U.S. PATENT DOCUMENTS

| | | | |
|---|---|---|---|
| 4,442,886 A * | 4/1984 | Dinulescu | F28F 3/083 165/76 |
| 4,848,450 A | 7/1989 | Lapkowsky | |
| 5,661,906 A * | 9/1997 | Beier | F28D 9/0037 29/890.039 |
| 6,802,365 B2 * | 10/2004 | Huguet | F28D 9/0037 165/DIG. 384 |
| 10,054,374 B2 * | 8/2018 | Dinulescu | F28F 19/00 |
| 2020/0116432 A1 | 4/2020 | Chi | |
| 2021/0389060 A1 | 12/2021 | Neefs et al. | |

FOREIGN PATENT DOCUMENTS

| | | |
|---|---|---|
| DE | 19530942 A1 | 2/1997 |
| DE | 102020120708 A1 | 3/2021 |
| GB | 820554 A * | 9/1959 |

* cited by examiner

*Primary Examiner* — Sarang Afzali
(74) *Attorney, Agent, or Firm* — Harness, Dickey & Pierce, P.L.C.

(57) ABSTRACT

A method of manufacturing a plate heat exchanger comprises bending metal sheets along a marginal edge running in the longitudinal direction to define a seam per metal sheet, forming a plate pair by arranging two plates on top of the other in a stacking direction and welding them together. The two plates are turned towards each other with their respective seams such that a seam of one plate is assigned to a free marginal edge of the other plate and the two plates being welded together along their respective seams. The method includes forming a plate stack by arranging and welding at least two plate pairs on top of the other. A first spacer extends along a first longitudinal edge and a second spacer extends along a second longitudinal edge with the spacers being welded together, the elongate spacers having an L-shaped cross-section, a C-shaped cross-section and/or a complete cross-section.

6 Claims, 15 Drawing Sheets

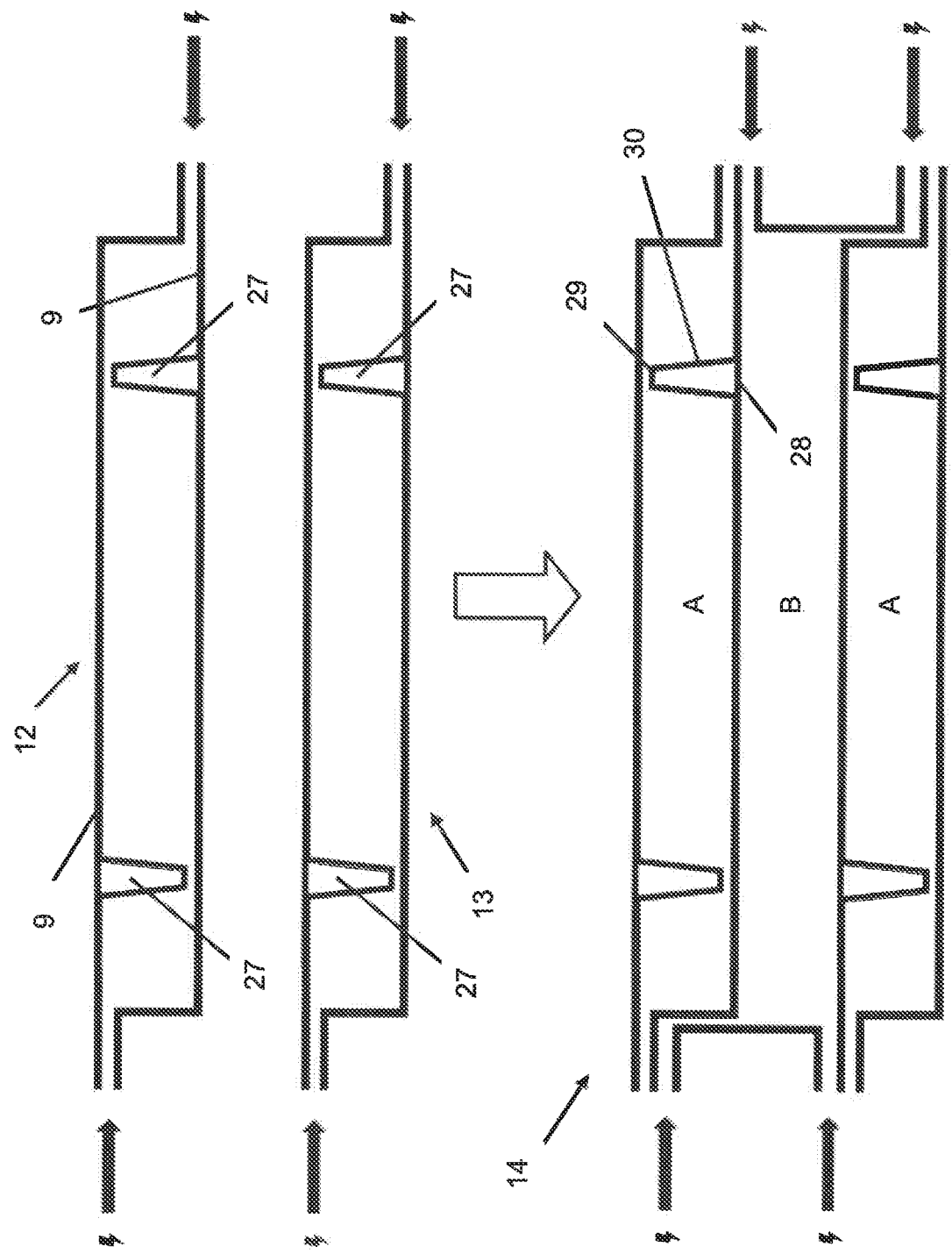

METHOD FOR THE PRODUCTION OF A PLATE HEAT EXCHANGER

CROSS-REFERENCE TO RELATED APPLICATIONS

This application claims the benefit of European Application No. 231512856, filed on Jan. 12, 2023. The entire disclosure of the application referenced above is incorporated herein by reference.

FIELD

The disclosure relates to a method of manufacturing a plate heat exchanger from a plurality of individual plates joined together to form a plate stack.

BACKGROUND

Plate heat exchangers are known from prior art, for example from DE 10 2020 120 708 A1.

The core of such plate heat exchangers is composed of individual plates and a plurality of spacers arranged between the individual plates to form a plate stack. These plate heat exchangers have proven themselves in practice.

However, the production of plate heat exchangers is characterized in a negative sense by a high energy requirement. This is particularly due to the fact that a large number of components have to be welded together.

A method of manufacturing a plate heat exchanger from individual plates joined together to form a plate stack is known from US 2021/0389060. The method comprises the following method steps:
  providing metal sheets having flat large surfaces,
  bending the metal sheets along a marginal edge running in the longitudinal direction, whereby a seam running in the longitudinal direction is formed per metal sheet,
  forming a plate pair by arranging two individual plates, each in the form of one of the previously bent metal sheets, one on top of the other in the stacking direction of the later plate stack and welding them together, the two individual plates being turned towards each other with their respective seams in such a way that one seam of one individual plate is assigned with a free marginal edge to the other individual plate, and the two individual plates being welded together along their respective seams and the free marginal edges cooperating therewith.

In times of scarcity of raw materials and rising energy prices, there is a vital industrial interest in manufacturing plate heat exchangers in an energy-efficient manner.

Based on the foregoing, the disclosure is therefore based on the problem of providing a method of manufacturing a plate heat exchanger of the kind described above, which is improved in terms of resource consumption and energy requirements and which at the same time provides plate heat exchangers with improved mechanical stability.

SUMMARY

In order to solve the problem, the disclosure proposes a method of manufacturing a plate heat exchanger from individual plates joined together to form a plate stack, the method at least comprising the following method steps:
  providing metal sheets having flat large surfaces,
  bending the metal sheets along a marginal edge running in the longitudinal direction, whereby a seam, in particular a standing seam, running in the longitudinal direction is formed per metal sheet,
  forming a plate pair by arranging two individual plates, each in the form of one of the previously bent metal sheets, one on top of the other in the stacking direction of the later plate stack and welding them together, the two individual plates being turned towards each other with their respective seams in such a way that one seam of one individual plate is assigned to a free marginal edge of the other individual plate, and the two individual plates being welded together along their respective seams and the free marginal edges cooperating therewith,
  forming a plate stack by arranging at least two plate pairs one on top of the other in the stacking direction of the later plate stack and welding them together, the two plate pairs being arranged one on top of the other with the interposition of a first spacer extending along a first longitudinal edge and a second spacer extending along a second longitudinal edge and the spacers being welded together with the respective adjacent plate pairs,
  in which case elongate spacers are used which have an L-shaped cross-section, a C-shaped cross-section and/ or a complete cross-section.

For the solution of the problem, the disclosure additionally proposes a method of manufacturing a plate heat exchanger from individual plates joined together to form a plate stack, the method at least comprising the following method steps:
  providing metal sheets having flat large surfaces,
  bending at least part of the metal sheets along two opposite marginal edges running in the longitudinal direction, the two marginal edges being bent in opposite directions, in which case two seams, in particular standing seams, running parallel to each other and extending in opposite directions from the sheet plane are formed per metal sheet,
  forming a plate stack by arranging individual plates, each in the form of one of the metal sheets previously bent on both sides, one on top of the other in the stacking direction of the later plate heat exchanger and welding them together, the individual plates with their respective seams being arranged one on top of the other in identical alignment, so that the seams of an individual plate are assigned to the respective free bending edges of the individual plate arranged directly above and below, and the two individual plates being welded together along their respective seams and the free bending edges cooperating therewith.

The common inventive concept of both methods according to the disclosure resides in that the number of spacers to be used and welded is reduced compared to prior art, preferably reduced to zero. This is achieved in both cases by the fact that the seams formed on the individual slats take over the function of the separate spacers previously required. This significantly reduces the required number of weld seams as well as process complexity and energy expenditure in both cases in an advantageous manner.

"Bending" in terms of the disclosure refers to a manufacturing process from the field of sheet metal forming in which part of a surface of a metal sheet is bent by a bending angle relative to a remaining flat surface part. In this case, the bent surface part forms a seam. The portion of the remaining flat surface part directly adjacent to the seam is referred to as "free bending edge" in terms of the disclosure. A "standing seam" is obtained by simple bending at a bending angle of 90°. Bending angles of 30° to 90° are generally preferred for the disclosure, since the resulting seams are mechanically comparatively stable and allow simple welding to a free marginal edge or a free bending edge. Preferably, all metal sheets used are bent at the same bending angle in order to obtain a mechanically stable plate stack of symmetrical design.

According to a preferred feature of the disclosure, it is provided that spacers (if used) are those which are at least partially formed from austenitic stainless steel. In terms of process engineering this is advantageous concerning availability and welding properties. Preferably, the spacers can be made of different materials. In particular, the material can be changed in the direction of flow of the medium. In this case, it is provided that corrosion-resistant stainless steel is chosen as the material for the spacer in the region of the flow inlet, while austenitic stainless steel is chosen as the material for the spacer at a predeterminable distance from the flow inlet. A gradual boundary layer is preferably formed between the two materials.

In contrast to US 2021/0389060 A1, the disclosure provides that the spacers (if used) are those with an L-shaped cross-section or a C-shaped cross-section. Advantageously, such spacers are easy to process. L-shaped or C-shaped cross-sections offer increased mechanical stability. In addition, there are synergetic advantages when using such spacers, as they can be produced by bending and/or cutting. Preferably, the spacers are therefore made from the same metal sheets as the individual plates of the plate heat exchanger. For this purpose, the metal sheets can first be bent and then cut into a strip or profile shape. Alternatively, the metal sheet is first cut into strips and then bent.

Spacers having a complex cross-section can also be used. In terms of the disclosure, a complex cross-section is one that has at least two different bending angles and is bent at least twice for this purpose. Preferably, the cross-section of the spacer is adapted in terms of bending technology to the contour of the surfaces of the adjacent plate pairs facing each other as intended. Preferably, the adaptation is carried out in such a way that the respective facing surfaces of the plate pairs on the one hand and the spacer on the other hand correlate with each other in terms of progression.

If the process management provides the use of individual plates in the form of metal sheets which are bent on both sides, the use of separate spacers can generally be dispensed with entirely.

However, the disclosure also expressly comprises such an embodiment in which the plate stack is formed partly from plate pairs connected via spacers and partly from individual plates bent on both sides. From a technical point of view, it can be advantageous to form the lower part of the plate stack in the stacking direction, in particular the lowest third which carries the bulk of the weight of the plate stack when installed as intended, from plate pairs and spacers in accordance with the disclosure. In this case, the lower part of the plate stack has an increased mechanical stability. The upper part of the plate stack in the stacking direction can on the other hand preferably be formed from individual plates bent on both sides and joined together in accordance with the disclosure. The connecting region is preferably formed by arranging a plate pair and an individual plate bent on both sides one on top of the other in the stacking direction of the later plate stack and welding them together. The plate pair and the individual plate are arranged on top of each other with the interposition of a spacer running along a first longitudinal edge and a seam of the individual plate running along a second longitudinal edge. The spacer is then welded to the plate pair on the one hand and the free bending edge of the individual plate on the other. The seam of the individual plate is welded to the plate pair. As a result, the upper part of the plate stack has a comparatively low weight. Overall, this process results in a particularly mechanically stable plate stack. First of all, the respective flat metal sheets are dimensioned and bent in such a way that the mutually facing flat surfaces of the metal sheets bent on one side and on both sides have identical dimensions.

Where the plate stack is formed at least partially from individual plates bent on both sides and arranged on top of each other, the method preferably also includes finalizing the plate stack. This can generally be done in two different ways. According to a first preferred embodiment, the seam extending away from the plate stack of at least one of the two outermost individual plates of the plate stack in the stacking direction of the plate stack is cut to the height of the adjacent free bending edge. This can be done particularly preferably with the uppermost and lowermost individual plate in the stacking direction to completely finalize the plate stack. This ensures that the individual plates do not have any protruding seams, which reduces the risk of injury to the user and the installation height of the plate stack. Preferably, cutting to length can be done in various ways, preferably by cutting, milling, sawing and/or grinding.

According to a second preferred embodiment that can be used in combination with the first embodiment or as an alternative, at least one additional metal sheet is first bent along only one marginal edge running in the longitudinal direction, whereby a seam, in particular a standing seam, running in the longitudinal direction is formed per metal sheet. The plate stack is then finalized on at least one side by at least one end plate in the form of a metal sheet previously bent on one side and an outermost individual plate in the stacking direction of the plate stack being turned towards each other with their respective seams, so that the seam of the end plate is assigned to a free bending edge of the individual plate and so that the seam of the individual plate is assigned to the free marginal edge of the end plate, the end plate and the individual plates being welded together along their respective seams and the free bending edge or free marginal edge cooperating therewith in each case. This process can be carried out particularly preferably with the uppermost and lowermost individual plate in the stacking direction to completely finalize the plate stack. This ensures that the plate stack has no protruding seams, which reduces the risk of injury to the user and the installation height of the plate stack. Both embodiments may also be combined, for example by cutting off the protruding seam of the lowermost individual plate according to the first embodiment and welding an individual plate bent on one side according to the second embodiment onto the uppermost individual plate bent on both sides.

According to the disclosure, the free edges of the bent part of the individual plate are sufficient to form a sufficient weld seam and to provide the necessary stability of the plate stack. However, it may be preferable, particularly for plate stacks with a greater height, to form a wider contact surface between the bent part of the individual plate and the free marginal edge or the free bending edge corresponding each other in terms of welding technology, in order to increase the stability of the welded joint. According to a preferred feature of the disclosure, it is therefore provided that at least a part of the seams of the individual plates produced by bending are bent one more time at least along their free marginal edges running in the longitudinal direction to produce a contact surface with at least one adjacent individual plate.

Various geometries are possible in this case. One option is to bend the seam in the same direction as the first fold in relation to the respective surface normal. Another option is to bend the seam in the opposite direction to the first fold in relation to the respective surface normal. Preferably, however, the seam is bent again at the same angle as the first fold. This ensures that the respective contact surface extends parallel to the remaining flat surface part of the individual plate. If bending in the same direction as the first fold is repeated, the bending angles of the first and second folds are preferably 90°. If bending in opposite direction to the first fold is repeated, the bending angles of the first and second fold are preferably between 30° and 90°.

As a further measure for increasing the mechanical stability of the plate stack, according to a preferred feature of the disclosure, it is provided that a plurality of conical metal elements is arranged between adjacent individual plates and/or between adjacent pate pairs. This is particularly advantageous in the case of large flat surface parts of the individual plates, in order to minimize or completely avoid arching of the surface parts in regions remote from the edges. In this case, it is preferably provided that the length of the metal elements is selected in such a way that it essentially corresponds to the distance between two adjacent individual plates or two adjacent plate pairs. In this way, arching can be completely prevented. The conical metal elements are preferably designed in the form of a truncated cone. Preferably, they each have a base surface at one end and a top surface at the other end. On the circumferential side, the conical metal elements have a circumferential lateral surface that connects the base surface and the top surface. Preferably, the base surface of each conical metal element is welded onto a flat large surface of an individual plate. Welding of only the base surface is usually sufficient, so that additional welding of the top surface can be omitted. Furthermore, in this embodiment, a relative displacement between the individual plates and/or plate pairs as a result of a material movement induced for instance by temperature is possible, so that material stresses are avoided in an advantageous manner.

According to a particularly preferred feature of the disclosure, it is provided that the plurality of the conical metal elements is welded in a regular distribution partly onto one and partly onto the other flat large surface of the individual plates facing each other.

This simplifies the manufacturing process, since only one type of individual plate has to be produced.

BRIEF DESCRIPTION OF THE DRAWINGS

The disclosure will be described in more detail below with reference to specific embodiments, examples of which are illustrated in the accompanying drawings, wherein it is shown by FIG. 1 a method known from prior art for manufacturing a plate heat exchanger known from prior art;

FIG. 15 a formation of a plate pair according to the first embodiment of the method of the disclosure from individual plates additionally comprising spacers in the form of conical metal elements.

DETAILED DESCRIPTION

Figure 1:
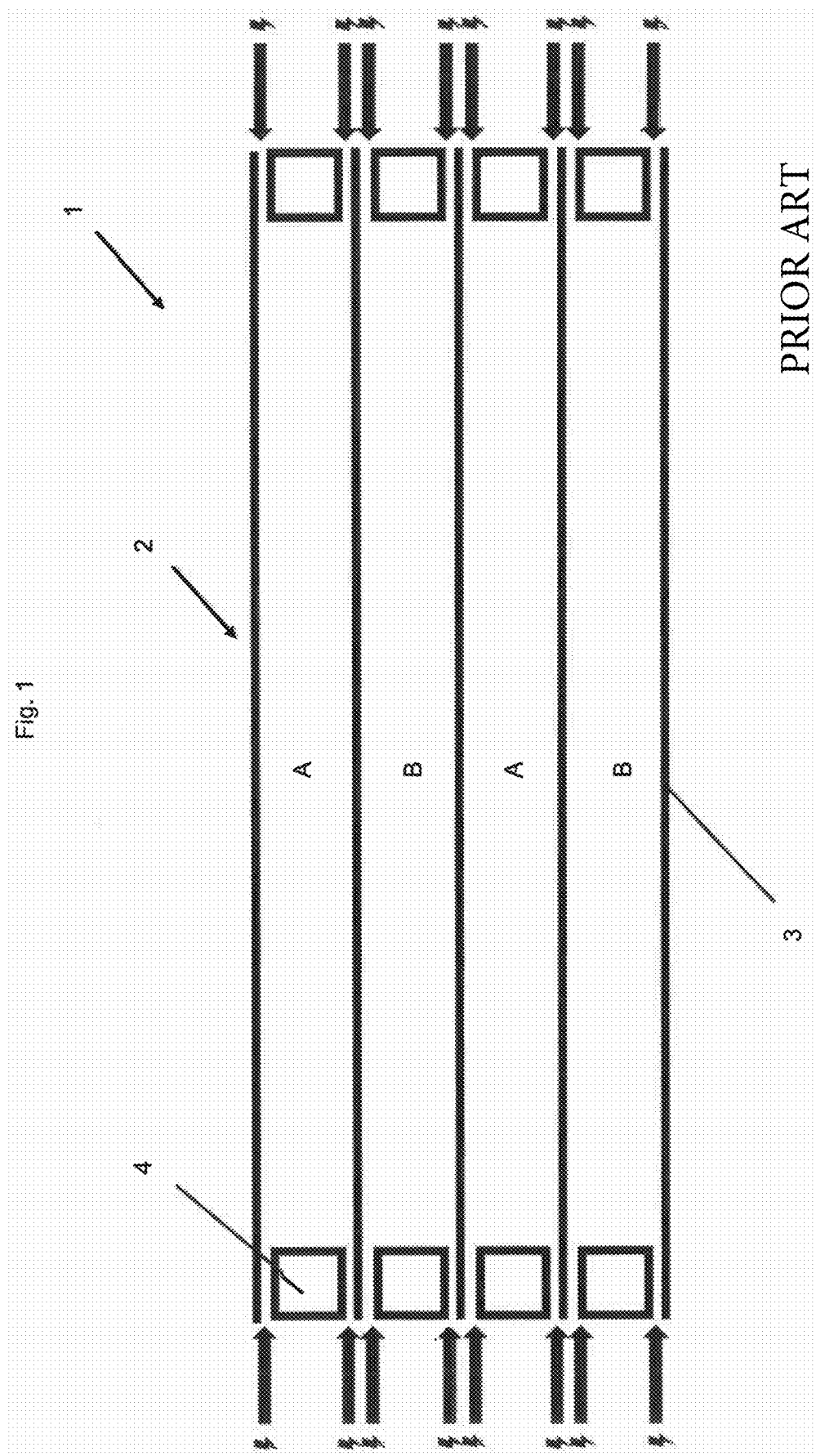

FIG. 1 shows a schematic view of a method known from prior art for manufacturing a plate heat exchanger 1. FIG. 1 shows a frontal view of the components of the plate heat exchanger 1, looking at the flow channels A, B.

Accordingly, a plate stack 2 is formed from a plurality of individual plates 3 and a plurality of spacers 4. Flow channels A, B for two different fluid media are formed alternately between the individual plates.

In this case, two flat individual plates 3 made for instance of sheet metal are welded together to form a flow channel A, B, with two spacers 4 interposed therebetween. According to this method, a total of four welding processes  are required to form corresponding welds. Consequently, a large number of weldings are required at a large number of welding points marked with black arrows to form the plate stack.

Even though this structure has proven itself in principle, this method is comparatively complex due to the large number of welding processes that are needed, and it requires a comparatively large amount of energy.

The various embodiments of the method according to the disclosure now aim to reduce the number of welding processes required to form a plate stack 2 in order to simplify the method and reduce the energy requirement in this way.

According to the disclosure, this objective is achieved in all embodiments by a specific use of individual plates in the form of bent metal sheets.

Figure 2:
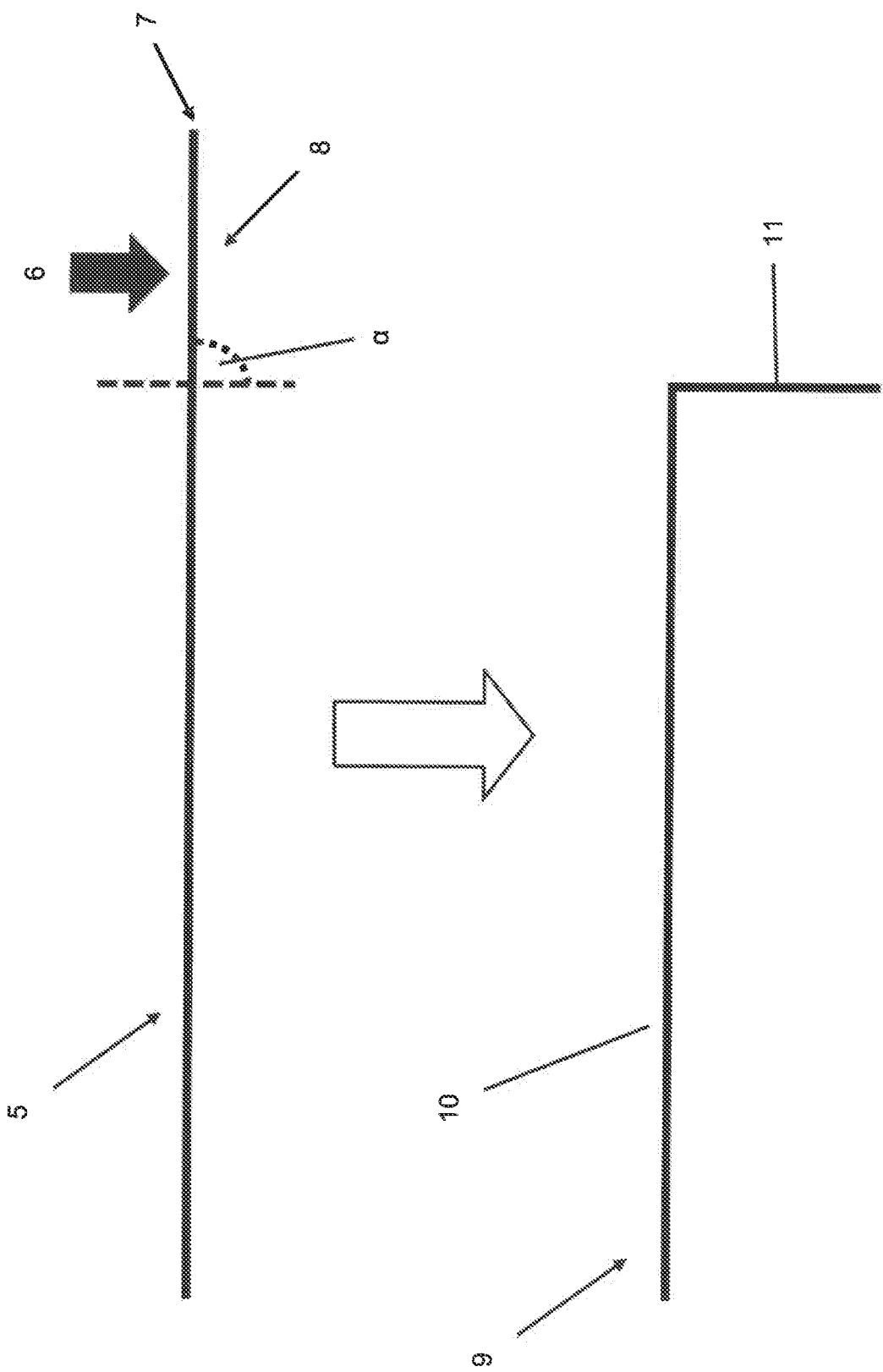
FIG. 2 the manufacture of an individual plate according to the disclosure using a method of manufacturing a plate heat exchanger in accordance with a first embodiment.

To this end, FIG. 2 shows a schematic representation of part of the method of the disclosure for manufacturing a plate heat exchanger according to a first embodiment thereof.

A flat metal sheet 5 is shown in side view. By applying a force 6 acting in the direction of the surface normal to the edge region 8 adjacent to a longitudinal edge 7 of the metal sheet 5, the edge region of the metal sheet 5 is bent by the bending angle α. In this case, the bending process is continued until the bending angle α of 90° is reached. The edge region 8 extends between the vertical dotted line and the longitudinal edge 7.

The result of the bending process is the individual plate 9 as shown. The individual plate 9 has a remaining flat surface part 10 and a seam 11, in this case a standing seam.

Figure 3:
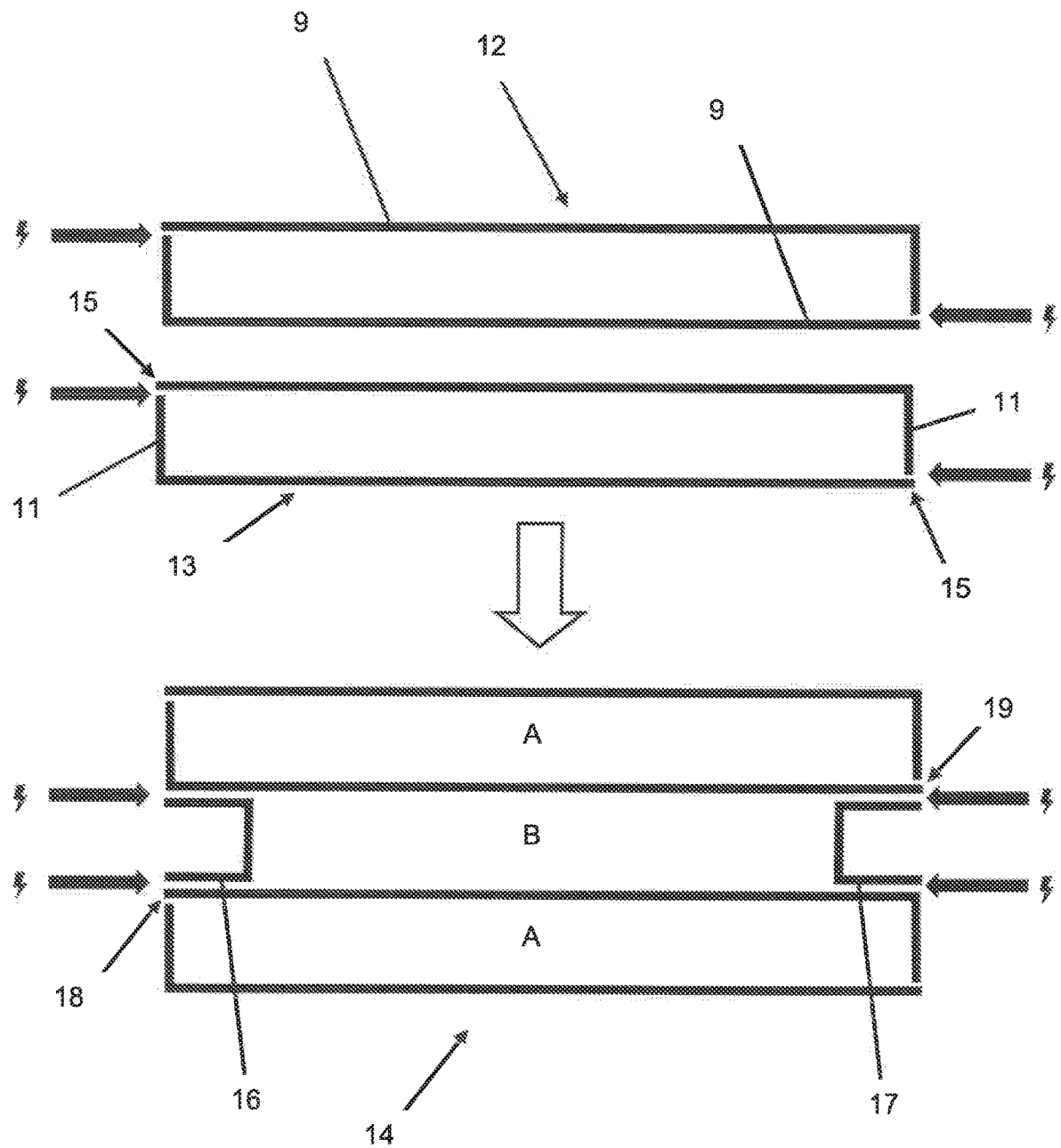
FIG. 3 a formation of plate pairs and of a plate stack according to the first embodiment of the method of manufacturing a plate heat exchanger in accordance with the disclosure.

According to the first embodiment of the disclosure shown in FIG. 3, plate pairs 12, 13 are first formed from the individual plates 9 produced in accordance with FIG. 2.

For this purpose, two individual plates 9, each in the form of one of the previously bent metal sheets 5, are arranged each above other in the stacking direction of the later plate stack 14 and welded together. With reference to the image plane, the stacking direction of the plate stack 14 corresponds to the height direction.

The two individual plates 9 are turned towards each other with their respective seams 11, so that a seam 11 of one individual plate 9 is assigned to a free marginal edge 15 of the other individual plate 9, the two individual plates 9 being welded together along their respective seams 11 and the free marginal edges 15 cooperating therewith.

It can be seen that due to the design and arrangement of the individual plates 9 according to the disclosure to form plate pairs 12, 13, only two weldings  are required per plate pair 12, 13 at the points marked with black arrows to form a flow channel. In prior art as shown in FIG. 1, at least four welds are required.

In the next step, as shown in FIG. 3, the welded plate pairs 12, 13 are joined together to form a plate stack 14, with the interposition of two spacers 16, 17. In this case, at least two plate pairs 12, 13 arranged on top of each other in the stacking direction of the later plate stack 14 and welded together. For this purpose, the two plate pairs 12, 13 are arranged one on top of the other, with a first spacer 16 extending along a first longitudinal edge 18 and a second spacer 17 extending along a second longitudinal edge 19 interposed therebetween. The spacers 16, 17 are then welded to their adjacent plate pairs 12, 13. In the present case, the longitudinal edges 18, 19 are formed by the respective free marginal edges 15.

In the present case, the spacers 16, 17 are formed as rod-shaped profiles with a C-shaped cross-section. The spacers 16, 17 are made of the same material as the metal sheets 5. Preferably, the spacers 16, 17 are formed beforehand from a metal sheet 5 by cutting and bending.

Compared to prior art, significantly fewer weldings are required when using the method according to the disclosure to form three flow channels A-B-A. The method of the disclosure according to the first embodiment only requires eight weldings, whereas a total of 12 (twelve) weldings are required in prior art. This corresponds to an approx. 33% reduction in weldings and the energy required therefor.

Figure 4:
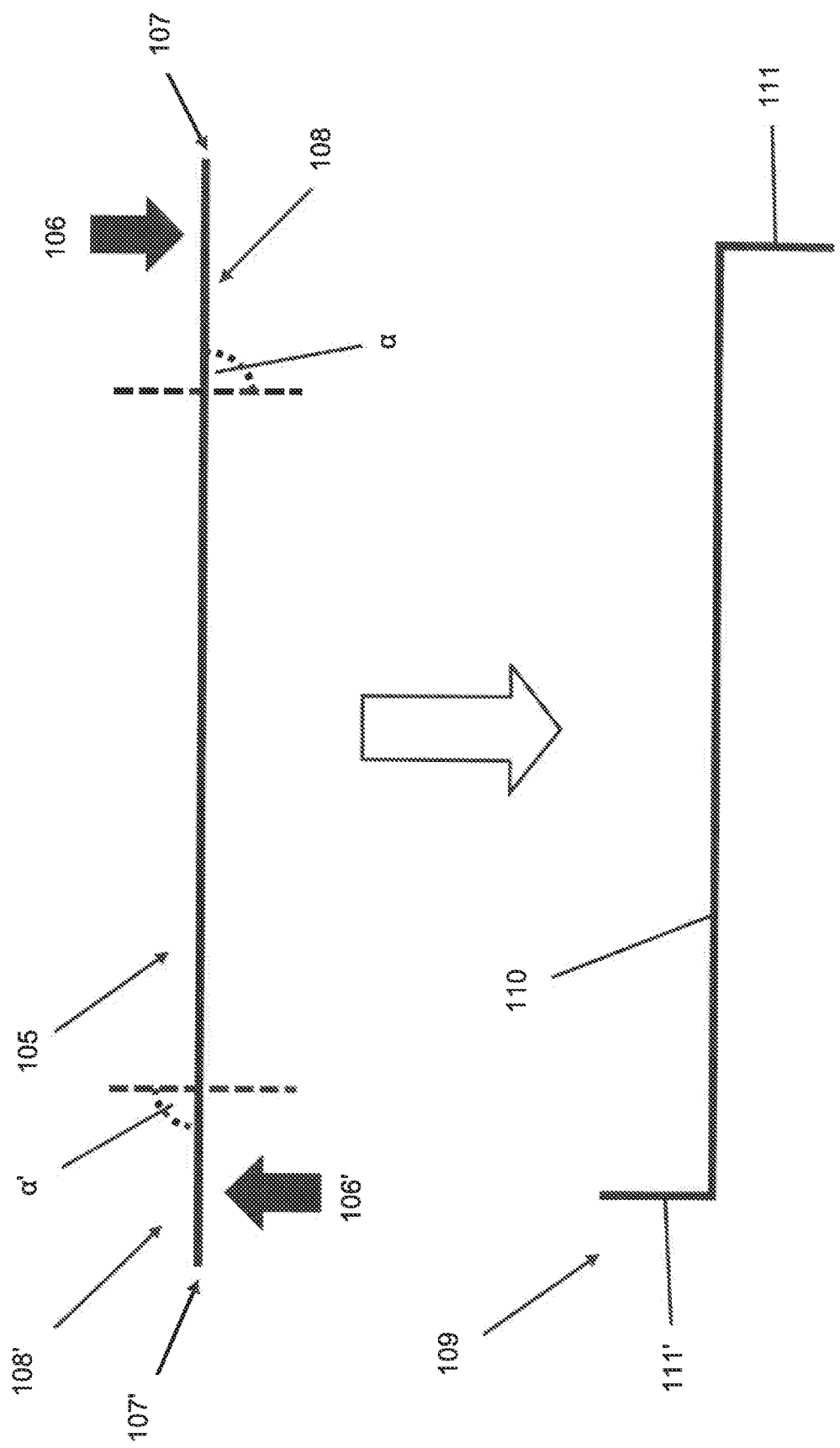
FIG. 4 a manufacture of an individual plate using a method according to the disclosure for manufacturing a plate heat exchanger of a second embodiment.

FIG. 4 shows a schematic representation of part of the method in accordance with the disclosure for manufacturing a plate heat exchanger according to a second embodiment.

A flat metal sheet 105 is shown in a side view. The metal sheet 105 can be identical to the metal sheet 5.

By applying a force 106 acting in the direction of the surface normal to the edge region 108 adjacent to a longitudinal edge 107 of the metal sheet 105 at one end face, the edge region 108 of the metal sheet 105 is bent downwards by the bending angle α relative to the horizontally extending plane of the metal sheet shown in FIG. 4. In this case, the bending process is continued until the bending angle α of 90° is reached.

By applying a force 106' acting in the direction of the surface normal to the edge region 108' adjacent to a longitudinal edge 107' of the metal sheet 105 at the other end face, the edge region 108' of the metal sheet 105 is bent upwards by the bending angle α' relative to the horizontally extending plane of the metal sheet shown in FIG. 4. In this case, the bending process is continued until the bending angle α' of 90° is reached. The edge regions 108, 108' are therefore bent in the opposite direction relative to the sheet plane.

The result of the bending process is the individual plate 109 as shown. The individual plate 109 has a remaining flat surface part 110 that extends between two seams 111, 111', in this case standing seams, extending on both sides. Starting from the flat surface part 110, the seams 111, 111' extend in the opposite direction from the surface part 110, in each case at a right angle away from the latter.

Figure 5:
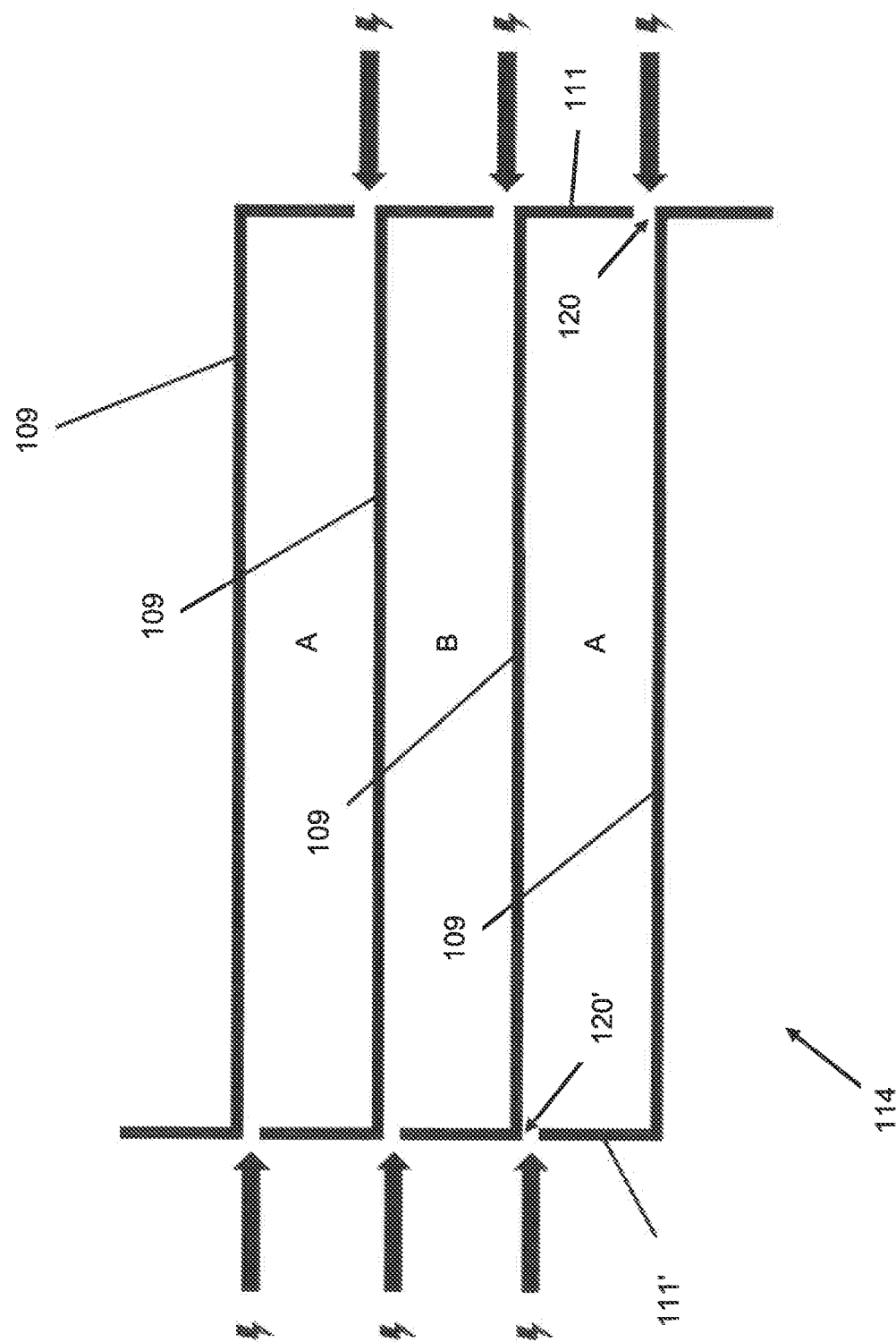
FIG. 5 a formation of a plate stack according to the second embodiment of the method of manufacturing a plate heat exchanger in accordance with the disclosure.

A plate stack 114 according to the second embodiment shown in FIG. 5 is formed from the individual plates 109 produced according to FIG. 4.

For this purpose, the individual plates 109, each in the form of one of the previously bent metal sheets 105, are arranged on top of each other in the stacking direction of the later plate stack 114 and welded together. With reference to the image plane, the stacking direction of the plate stack 114 corresponds to the height direction.

Preferably, in this method step, all the individual plates 109 forming the later plate stack 114 are arranged on top of each other in a positioning device not shown and then welded together. In this case, at least part of the welding points marked with a black arrow are welded at the same time. Preferably, all welding points in the plate stack 114 may be welded simultaneously, whereby the process is accelerated in an advantageous manner on the one hand. On the other hand, material stresses in the later plate stack 114 are avoided by the fact that part of the welding points or all welding points are exposed to the same temperatures at the same time.

The individual plates 109 are turned towards each other with their respective seams 111, 111', so that a seam 111 of one individual plate 109 is assigned to a free bending edge 120 of the other individual plate 109 and that a seam 111' of one individual plate 109 is assigned to a free bending edge 120' of the other individual plate 109. The individual plates 109 are then welded together along their respective seams 111, 111' and the respective free bending edges 120' cooperating therewith.

It can be seen that due to the design and arrangement of the individual plates 109 according to the disclosure to form a plate stack 114, only two weldings  are required for the connection of two individual plates at the points marked with black arrows to form a flow channel. In prior art according to FIG. 1, at least four weldings are required for this.

With regard to the formation of a plate stack in prior art, significantly fewer weldings are required to form three flow channels A-B-A by using the method according to the disclosure. While a total of 12 (twelve) weldings are required for this in prior art, the method of the disclosure according to the second embodiment requires only six weldings. This corresponds to a 50% reduction in weldings and the energy required therefor.

Figure 6:
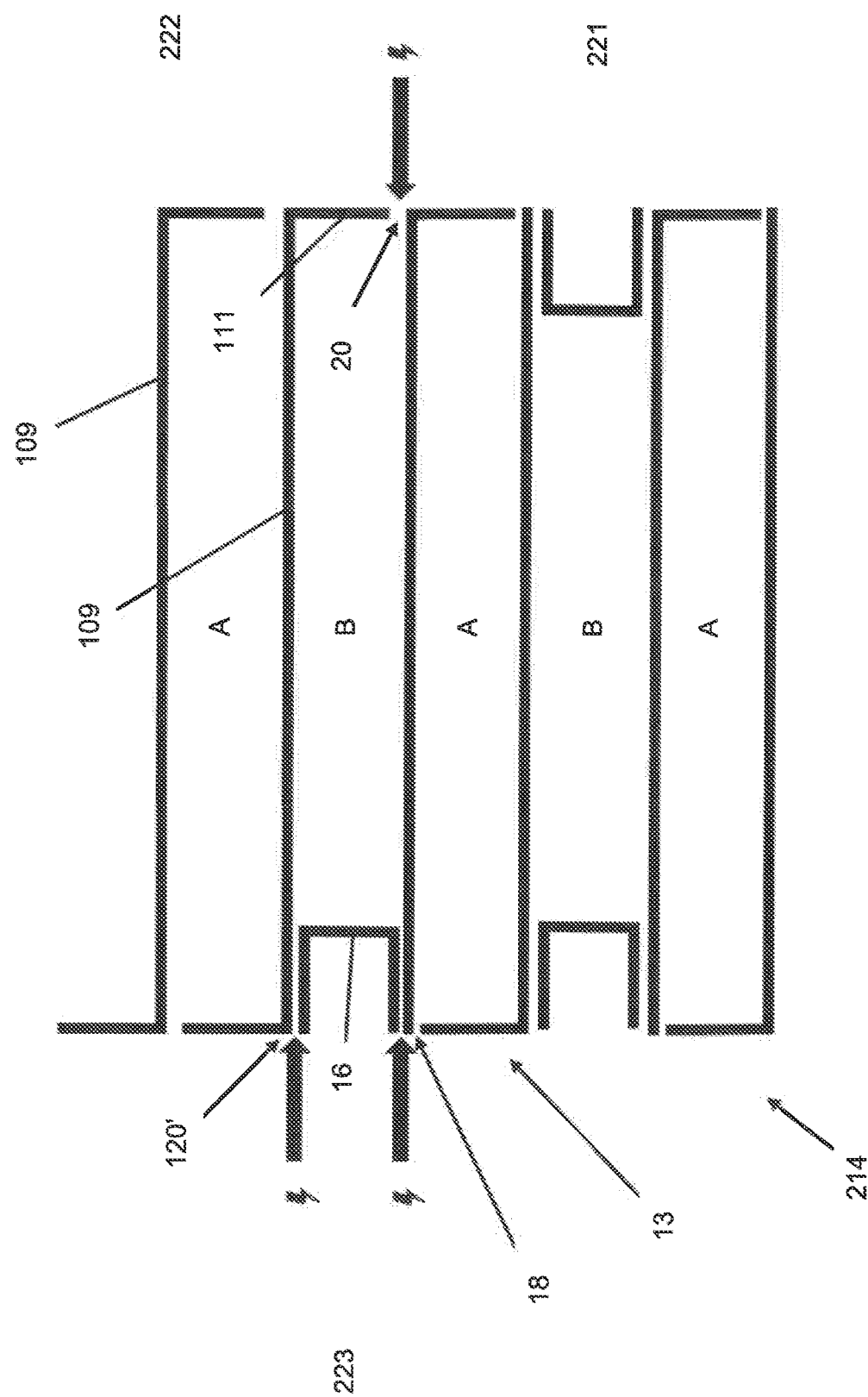
FIG. 6 a formation of a plate stack according to a third embodiment of the method of manufacturing a plate heat exchanger in accordance with the disclosure.

FIG. 6 shows a third embodiment of the disclosure. Here, a lower part 221 of the plate stack 214 in the stacking direction of the plate stack 214 is first formed in accordance with the first embodiment of the method of the disclosure (FIGS. 2 and 3). Subsequently, the upper part 222 of the plate stack 214 in the stacking direction of the plate stack 214 is formed in accordance with the second embodiment of the method of the disclosure (FIGS. 4 and 5).

For this purpose, a connecting region 223 is created between the two parts 221, 222. A plate pair 13 formed in accordance with the first embodiment is welded, at the welding points marked with black arrows, to an individual plate 109 formed in accordance with the second embodiment and bent on two sides, with only one spacer 16 interposed.

In particular, the plate pair 13 and the single plate 109 bent on both sides are arranged one on top of the other in the stacking direction of the later plate stack 214 and welded together. The plate pair 13 and the individual plate 109 are arranged one on top of the other with the interposition of a spacer 16 extending along a first longitudinal edge and a seam 111 of the individual plate 109 extending along a second longitudinal edge. The spacer 16 is then welded to the plate pair 13 on the one hand and to the free bending edge 120' of the individual plate 109 on the other hand. Furthermore, the seam 111 of the individual plate 109 is welded together with the free bending edge 20 of the plate pair 13.

Subsequently, the upper part 222 of the plate stack 214 is formed in accordance with the second embodiment of the method of the disclosure as illustrated in FIGS. 4 and 5.

The lower part 221 of the plate stack 214 formed in this way has an increased mechanical strength. In contrast, the upper part 222 of the plate stack 214 in the stacking direction has a comparatively low weight. Overall, a particularly mechanically stable plate stack 214 is formed by this method. In the present case, the flat metal sheets 5, 105 are dimensioned and bent in such a way that the remaining flat surface parts 10, 110 of the individual plates 9, 109, which are bent on one and on both sides, have identical dimensions.

This embodiment also has a reduced number of required weldings  compared to the method known from prior art.

If the plate stack 114, 214 is formed in accordance with the second or third embodiment of the method of the disclosure, a further method step consists in finalizing the plate stack 114, 214. In principle, this can be carried out in two different ways, which are shown schematically in FIGS. 7 and 8.

Figure 7:
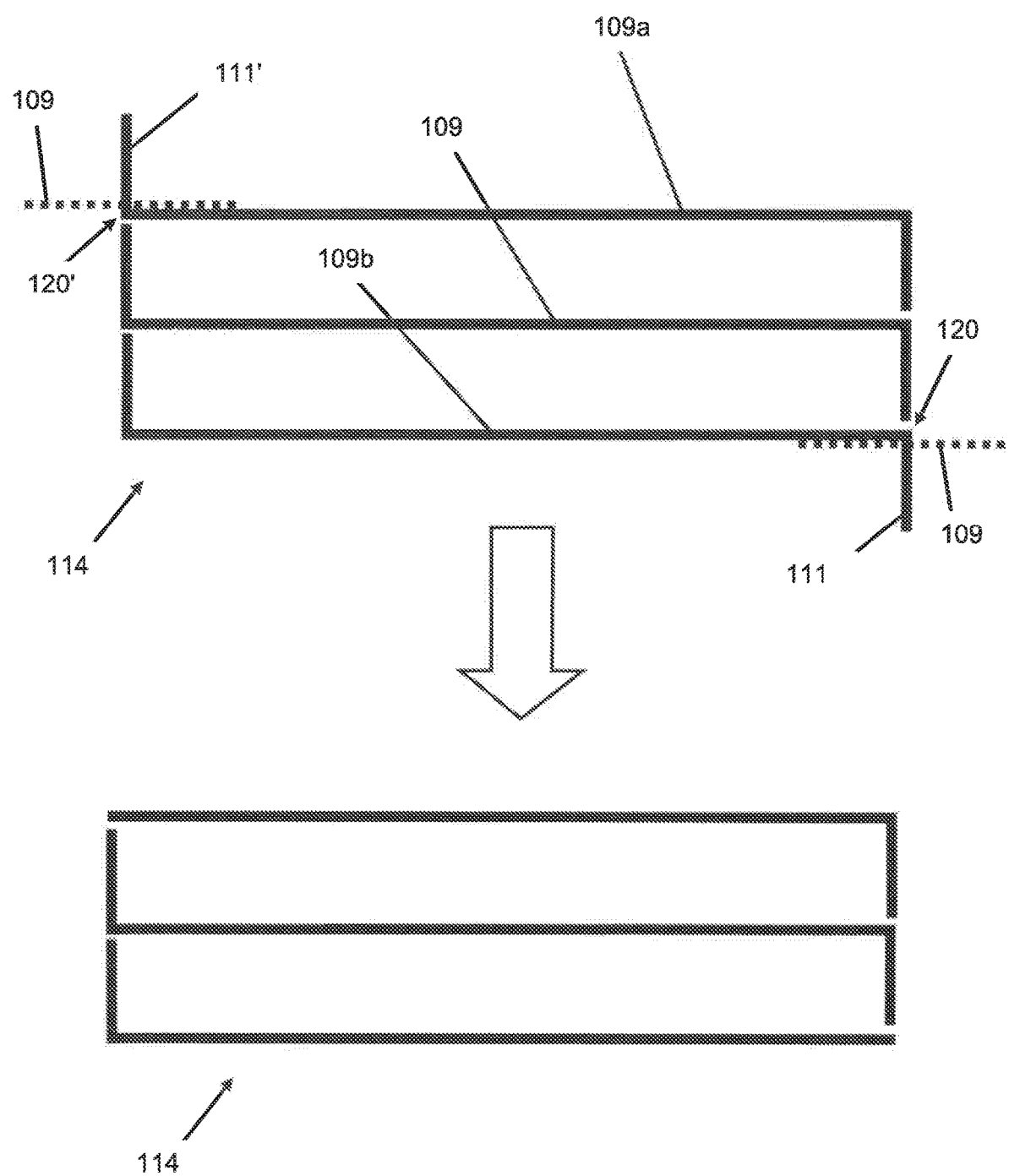
FIG. 7 finalizing a plate stack formed as illustrated in FIG. 5 or FIG. 6 according to a first embodiment of the disclosure.

According to a first option illustrated in FIG. 7 using the example of the plate stack 114, the seams 111, 111' of the two outermost individual plates 109a, 109b of the plate stack 114 extending away from the plate stack 114 in the stacking direction of the plate stack 114 are cut to the height of the adjacent free bending edge 120, 120'. In the present case, this is carried out with the uppermost individual plate 109a and the lowermost individual plate 109b in the stacking direction to completely finalize the plate stack 114 at both ends.

This ensures that the individual plates 109a, 109b do not have any protruding seams, which reduces the risk of injury to the user and the installation height of the plate stack 114. Preferably, the plates can be cut to length in various ways, preferably by means of cutting, milling, sawing and/or grinding.

Figure 8:
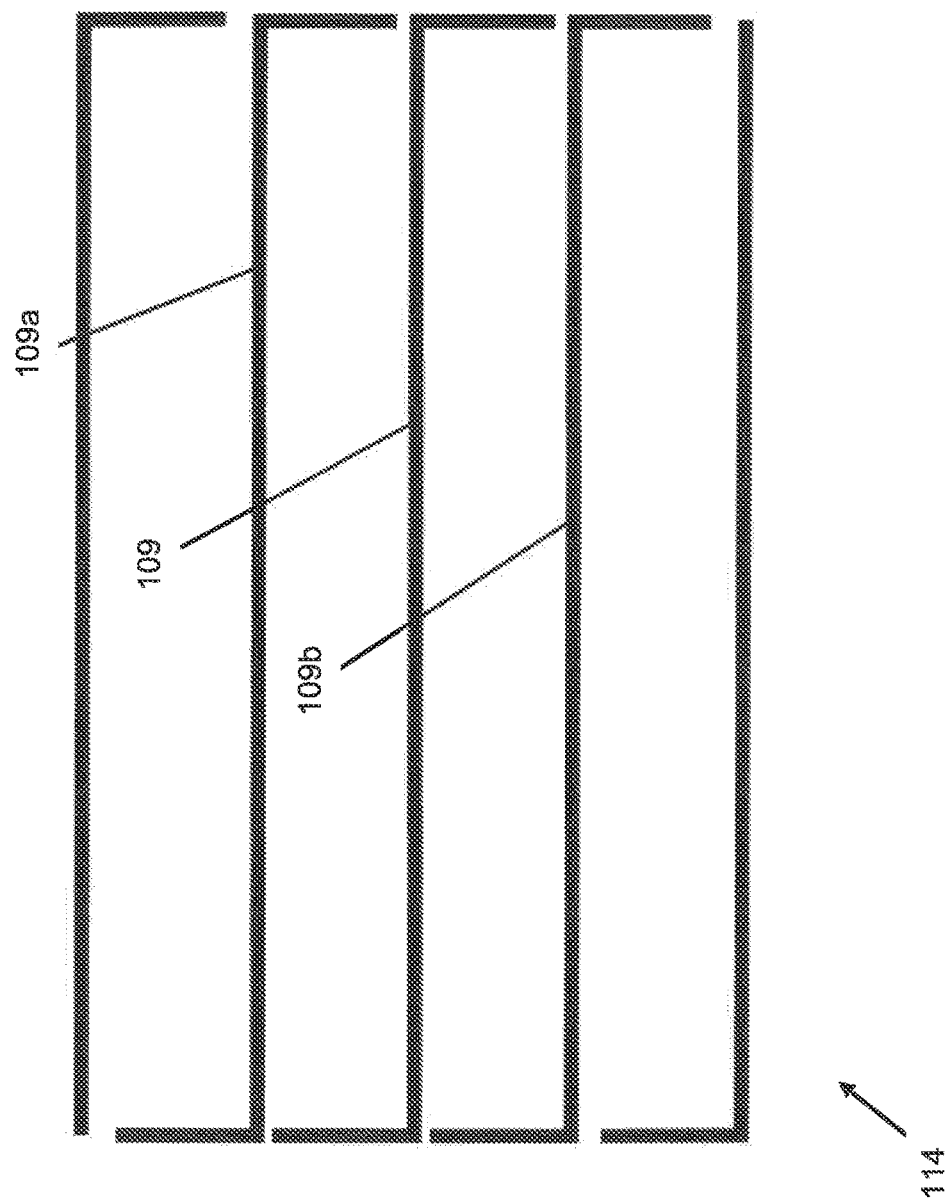
FIG. 8 finalizing a plate stack formed as illustrated in FIG. 5 or FIG. 6 according to a second embodiment of the disclosure.

According to one option illustrated in FIG. 8 using the example of the plate stack 114, two additional individual plates 109c are first produced according to the example of the method step shown in FIG. 2 by bending metal sheets along only one edge running in the longitudinal direction. The individual plates 109c serve as end plates in the present case.

Subsequently, the plate stack 114 is closed on both sides by the respective end plate 109c with the uppermost individual plate 109a in the stacking direction of the plate stack 114 and the lowermost individual plate 109b being turned towards each other with their respective seams 111, 111', so that the seam 111, 111' of an end plate 109c is assigned to a free bending edge 120, 120' of the respective individual plate 109a, 109b and so that the seam 111, 111' of the respective individual plate 109a, 109b is assigned to the free marginal edges 115 of the end plates 109c, the end plates 109c and the individual plates 109a, 109b being welded together along their respective seams 111, 111' and the respective free bending edges 120, 120' or free marginal edges 115 cooperating therewith. This ensures that the plate stack 114 does not have any protruding seams 111, 111', which reduces the risk of injury to the user and the installation height of the plate stack 114.

It is also possible to combine the two options shown in FIGS. 7 and 8, for example by cutting the protruding seam 111 of the lowermost individual plate 109b to length in accordance with the first embodiment and welding an end plate 109c bent at one side onto the uppermost individual plate 109b bent at both sides.

Figure 9:
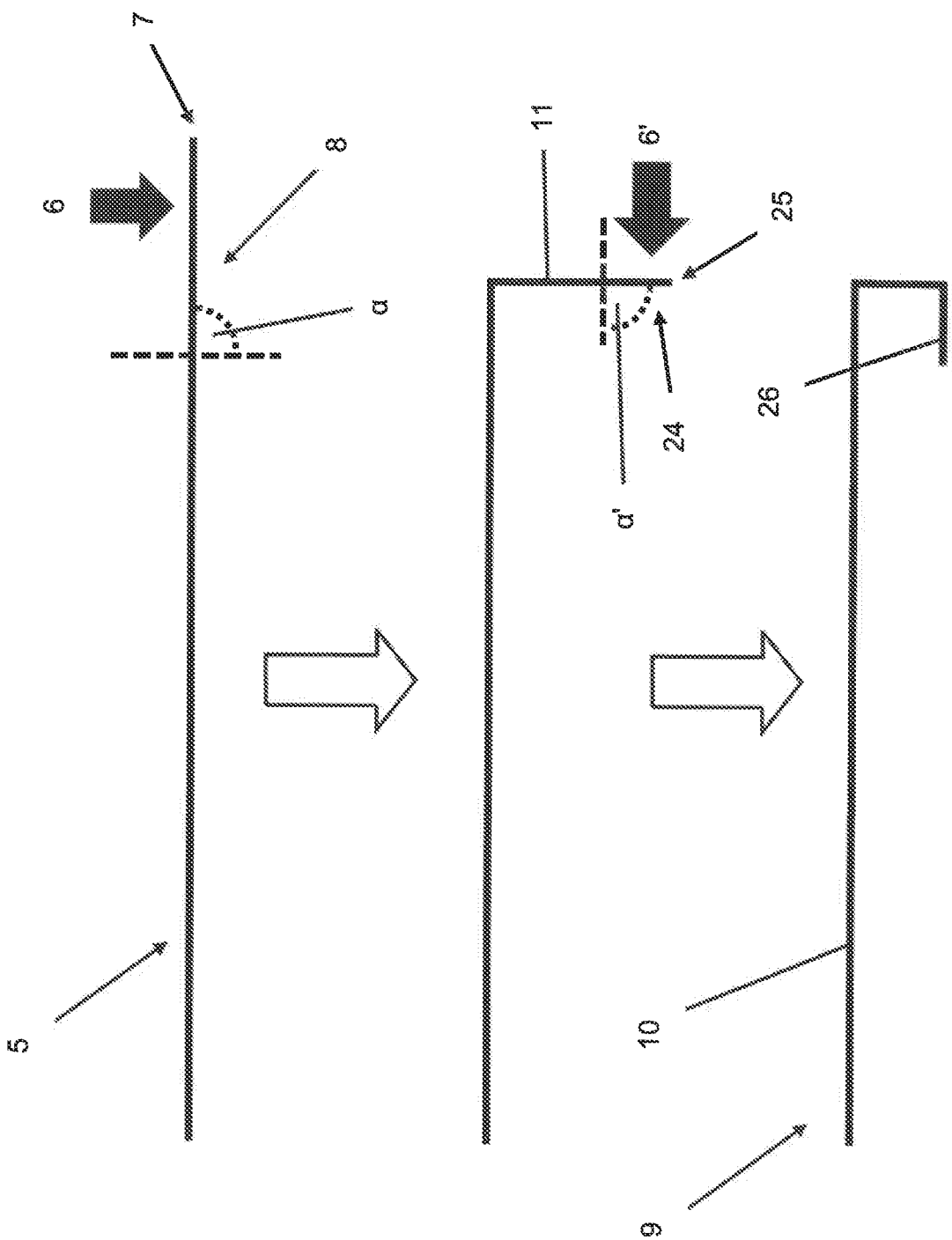
FIG. 9 a manufacture of a further individual plate in accordance with the disclosure for use in the method of the disclosure according to the first embodiment.
Figure 10:
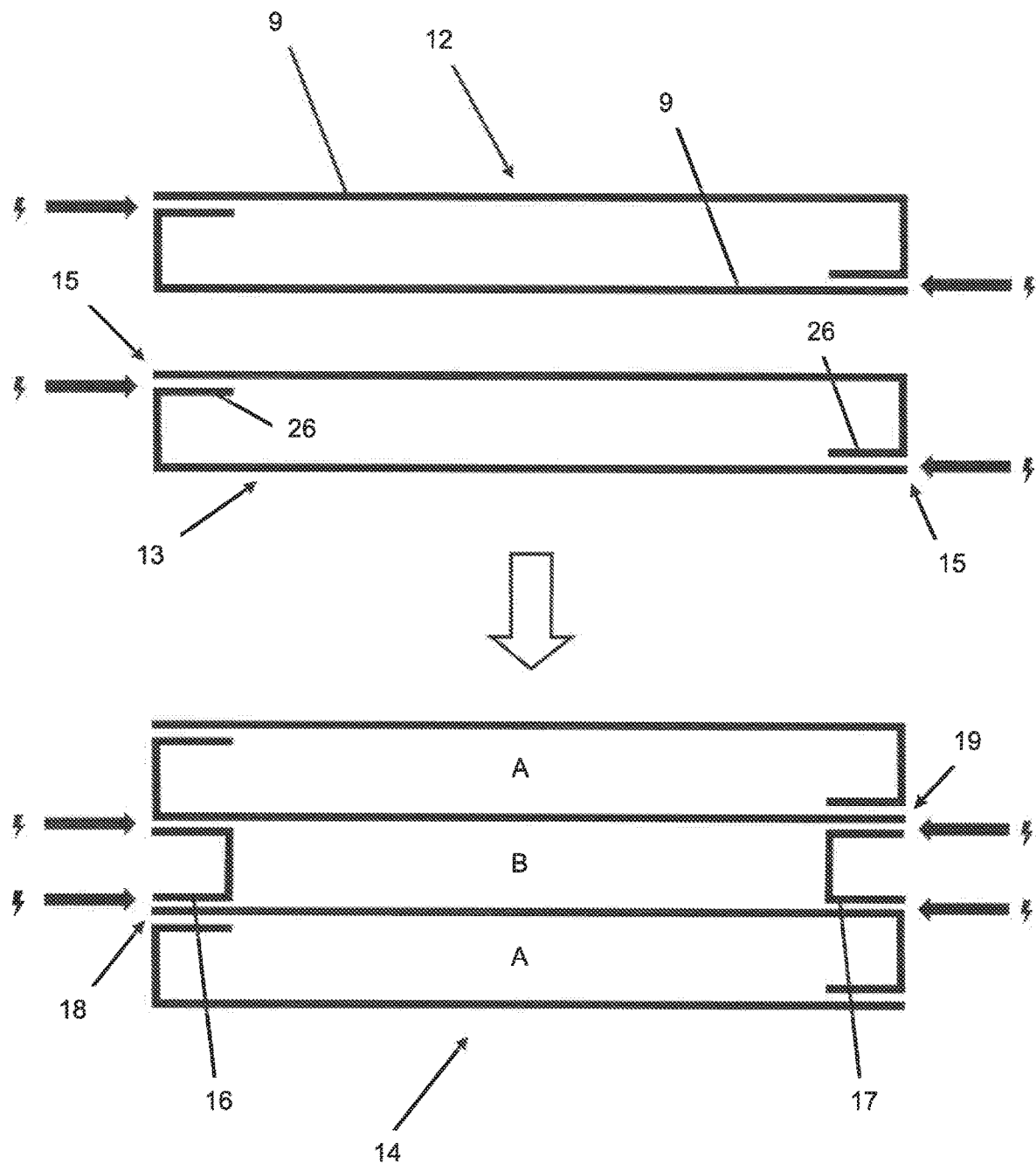
FIG. 10 a formation of plate pairs and a plate stack according to the first embodiment of the method of the disclosure using individual plates according to FIG. 9.

FIGS. 9 and 10 show a schematic representation of a further embodiment of the method according to the disclosure for manufacturing a plate heat exchanger according to the first embodiment.

FIG. 9 shows a flat metal sheet 5 in a side view. By applying a force 6 acting in the direction of the surface normal to the edge region 8 adjacent to a longitudinal edge 7 of the metal sheet 5, the edge region of the metal sheet 5 is bent by the bending angle $\alpha$. In this case, the bending process is continued until the bending angle $\alpha$ of 90° is reached.

The intermediate result of the bending process is a metal sheet 5 which is bent at one end. The metal sheet 5 has a remaining flat surface part 10 and a seam 11, in this case a standing seam.

To improve the mechanical stability of the resulting plate stack 14 and to simplify welding, an edge region 24 of the seam 11 of the metal sheet 5 is bent along its free marginal edge 25 running in the longitudinal direction to create a contact surface 26 with at least one adjacent individual plate. The edge region 24 extends between the free marginal edge 25 and the dashed horizontal line.

In the present case, the seam is bent in the same direction as the first bend in relation to the respective surface normal with a force 6'. Furthermore, in the present case, the seam is bent at a bending angle $\alpha'$ of 90°. The bending angle $\alpha'$ therefore corresponds to the bending angle $\alpha$ of the first bending. This results in an individual plate 9 with a flat surface part 10 and a seam 11, the seam having a contact surface 26 that extends inwards parallel to the remaining flat surface part 10.

Plate pairs 12, 13 are first formed in accordance with the first embodiment of the disclosure shown in FIG. 10 from the individual plates 9 produced in accordance with FIG. 9.

For this purpose, two individual plates 9, each in the form of one of the previously bent metal sheets 5, are arranged one on top of the other in the stacking direction of the later plate stack 14 and welded together. With reference to the image plane, the stacking direction of the plate stack 14 corresponds to the height direction.

The two individual plates 9 are turned towards each other with their respective contact surfaces 26 in such a way that a contact surface 26 of one individual plate 9 is assigned to a free marginal edge 15 of the other individual plate 9, and the two individual plates 9 are welded together along their respective contact surfaces 26 and the free marginal edges 15 cooperating therewith.

In the next step, as shown in FIG. 10, the welded plate pairs 12, 13 are joined together to form a plate stack 14 with two spacers 16, 17 interposed. In this case, at least two plate pairs 12, 13 are arranged one on top of the other in the stacking direction of the later plate stack 14 and welded together. For this purpose, the two plate pairs 12, 13 are arranged one on top of the other with the interposition of a first spacer 16 extending along a first longitudinal edge 18 and a second spacer 17 extending along a second longitudinal edge 19. The spacers 16, 17 are then welded to the respective adjacent plate pairs 12, 13. In the present case, the longitudinal edges 18, 19 are formed by the respective free marginal edges 15.

In the present case, the spacers 16, 17 are formed as rod-shaped profiles with a C-shaped cross-section. The spacers 16, 17 are formed from the same material as the metal sheets 5. Preferably, the spacers 16, 17 are previously formed from a metal sheet 5 by cutting and bending.

Figure 11:
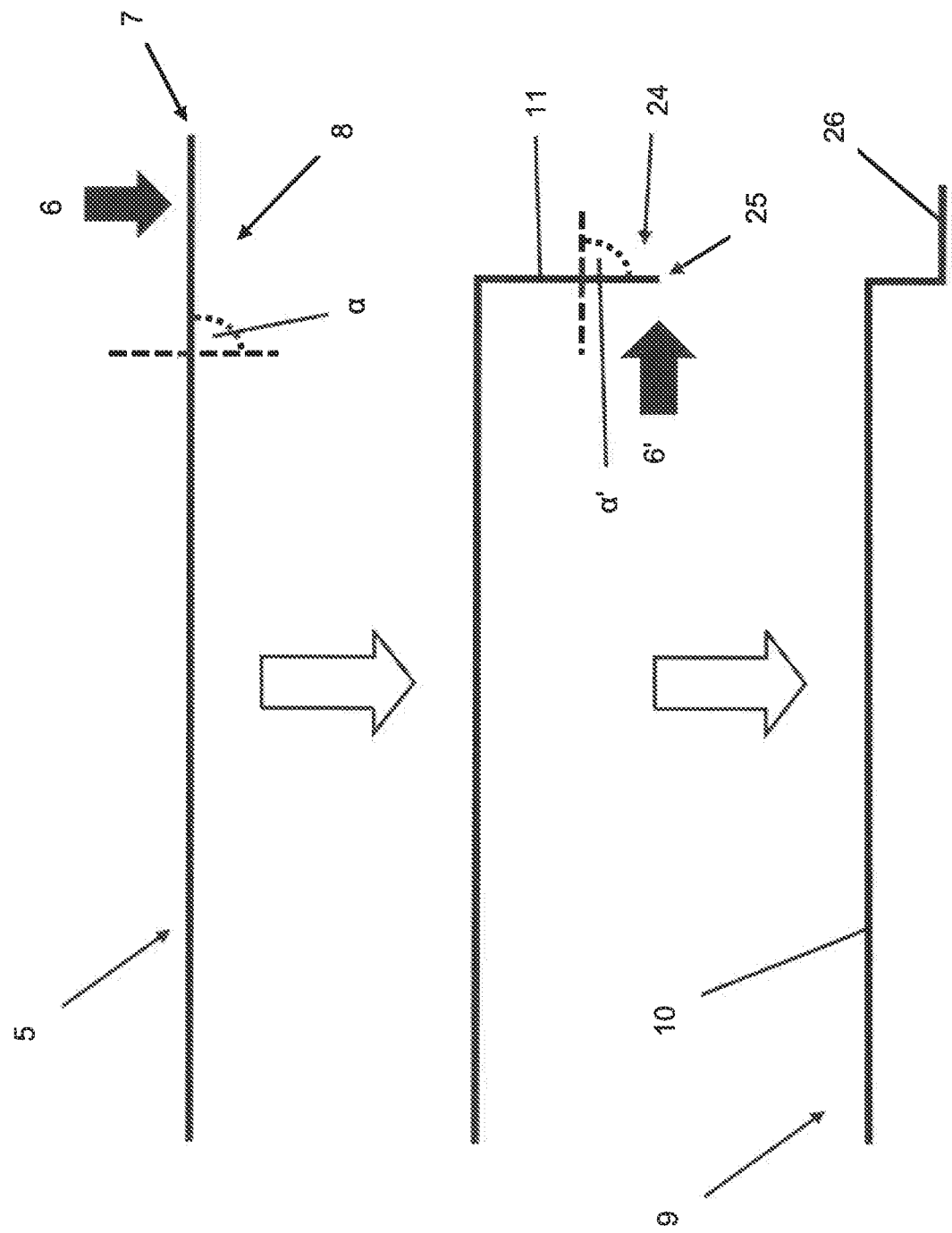
FIG. 11 a manufacture of a further individual plate in accordance with the disclosure for use in the method of the disclosure according to the first embodiment.
Figure 12:
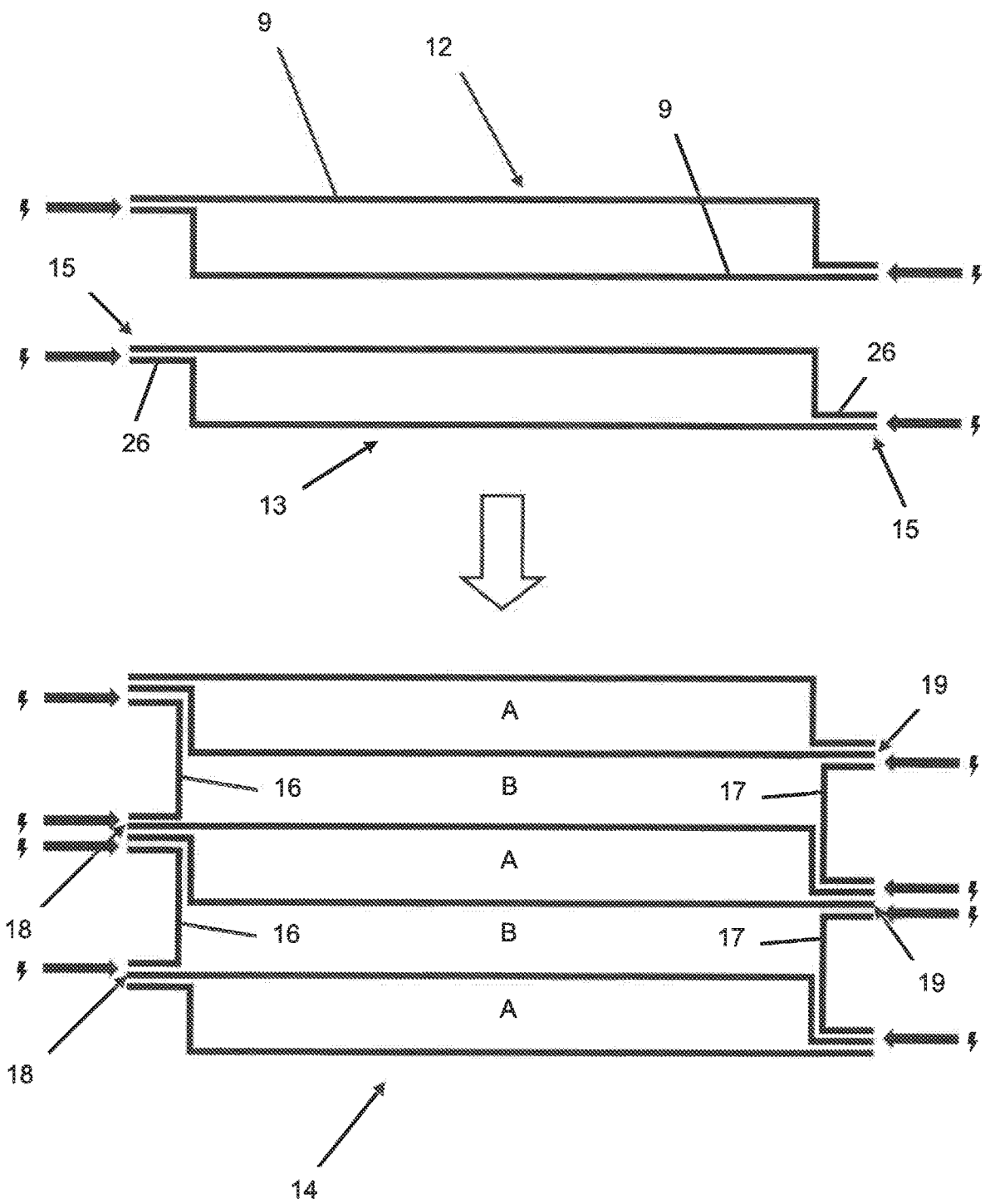
FIG. 12 a formation of plate pairs and a plate stack according to the first embodiment of the method of the disclosure using individual plates according to FIG. 11.

FIGS. 11 and 12 show a schematic representation of a further embodiment of the method according to the disclosure for manufacturing a plate heat exchanger according to the first embodiment.

FIG. 11 shows a flat metal sheet 5 in a side view. By applying a force 6 acting in the direction of the surface normal to the edge region 8 adjacent to a longitudinal edge 7 of the metal sheet 5, the edge region of the metal sheet 5 is bent by the bending angle α. The bending process continued until the bending angle α of 90° is reached.

The intermediate result of the bending process is a metal sheet 5 which is bent at one end. The metal sheet 5 has a remaining flat surface part 10 and a seam 11, in this case a standing seam.

To improve the mechanical stability of the resulting plate stack 14 and to simplify welding, an edge region 24 of the seam 11 of the metal sheet 5 is bent along its free marginal edge 25 running in the longitudinal direction to produce a contact surface 26 with at least one adjacent individual plate. The edge region 24 extends between the free marginal edge 25 and the dashed horizontal line.

In the present case, the seam is bent in the opposite direction to the first fold in relation to the respective surface normal. Furthermore, in the present case, bending is performed at a bending angle α' of 90°. The bending angle α' thus corresponds to the bending angle α of the first fold. This results in an individual plate 9 having a flat surface part 10 and a seam 11, the seam having a contact surface 26 which extends away from the remaining flat surface part 10 in the same direction.

Plate pairs 12, 13 according to the first embodiment are first formed a shown in FIG. 12 from the individual plates 9 according to FIG. 11.

For this purpose, two individual plates 9, each in the form of one of the previously bent metal sheets, are arranged one on top of the other in the stacking direction of the later plate stack 14 and welded together. With reference to the image plane, the stacking direction of the plate stack 14 corresponds to the height direction.

The two individual plates 9 are turned towards each other with their respective contact surfaces 26, so that a contact surface 26 of one individual plate 9 is assigned to a free marginal edge 15 of the other individual plate 9, and the two individual plates 9 are welded together along their respective contact surfaces 26 and the free marginal edges 15 cooperating therewith.

In the next step, as shown in FIG. 12, the welded plate pairs 12, 13 are joined together to form a plate stack 14 with two spacers 16, 17 interposed. At least two plate pairs 12, 13 are arranged one on top of the other in the stacking direction of the later plate stack 14 and welded together. For this purpose, the two plate pairs 12, 13 are arranged one on top of the other with the interposition of a first spacer 16 extending along a first longitudinal edge 18 and a second spacer 17 extending along a second longitudinal edge 19. The spacers 16, 17 are then welded to the adjacent plate pairs 12, 13. In the present case, the longitudinal edges 18, 19 are formed by the respective free marginal edges 15.

The spacers 16, 17 are formed as rod-shaped profiles with a C-shaped cross-section. The spacers 16, 17 are formed from the same material as the metal sheets 5. Preferably, the spacers 16, 17 are previously formed from a metal sheet 5 by cutting and bending.

The shape of the individual plates 9 with the contact area 26 extending away from the flat surface part 10 and their special arrangement make welding much easier. This is because the connecting regions between the contact area 26 and the free marginal edge 15 for forming the plate pairs on the one hand and between the spacers 16, 17 and the free marginal edge 15 on the other hand extend away from the plate stack and are therefore more easily accessible for welding tools.

Figure 13:
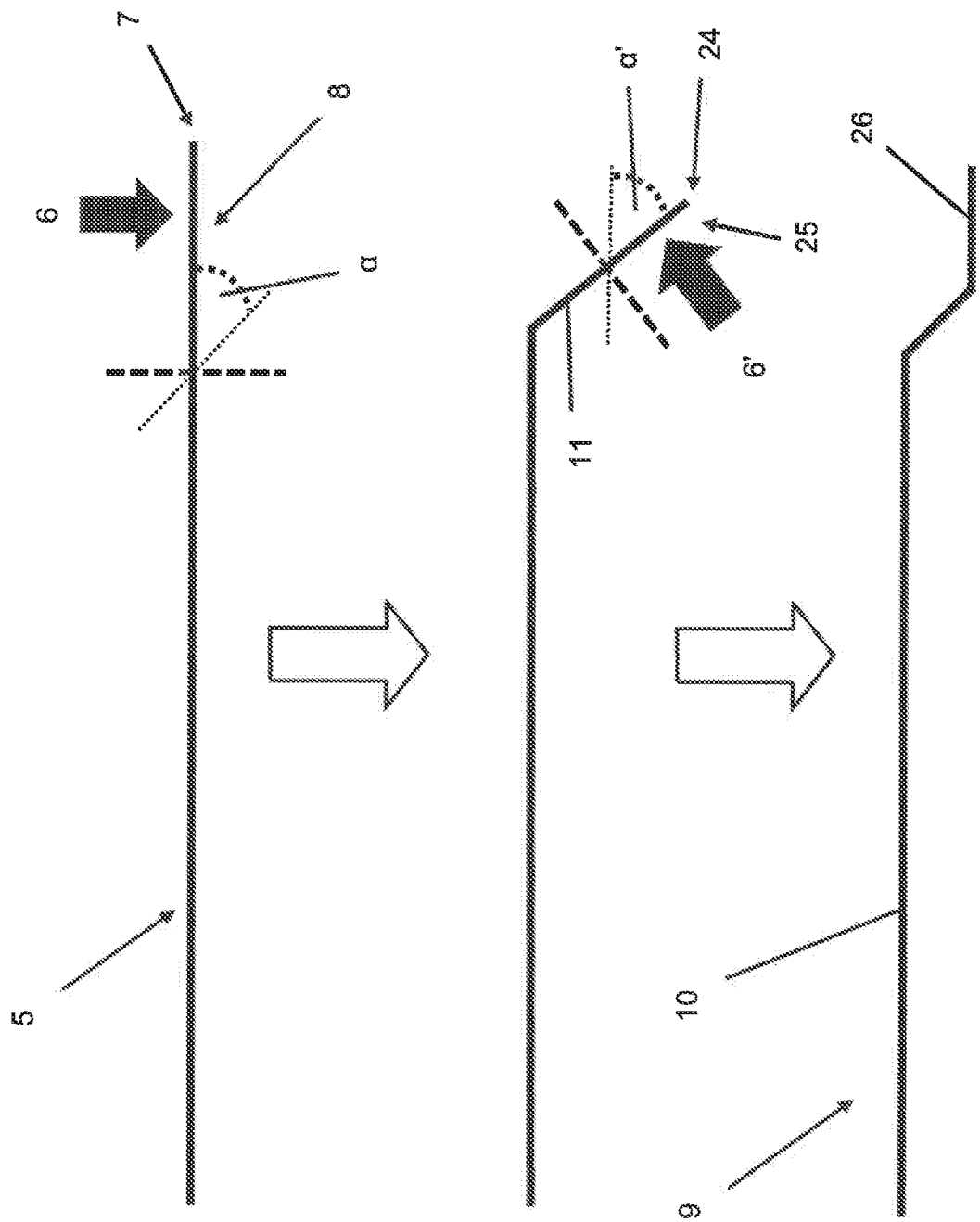
FIG. 13 a manufacture of a further individual plate in accordance with the disclosure for use in the method of the disclosure according to the first embodiment.
Figure 14:
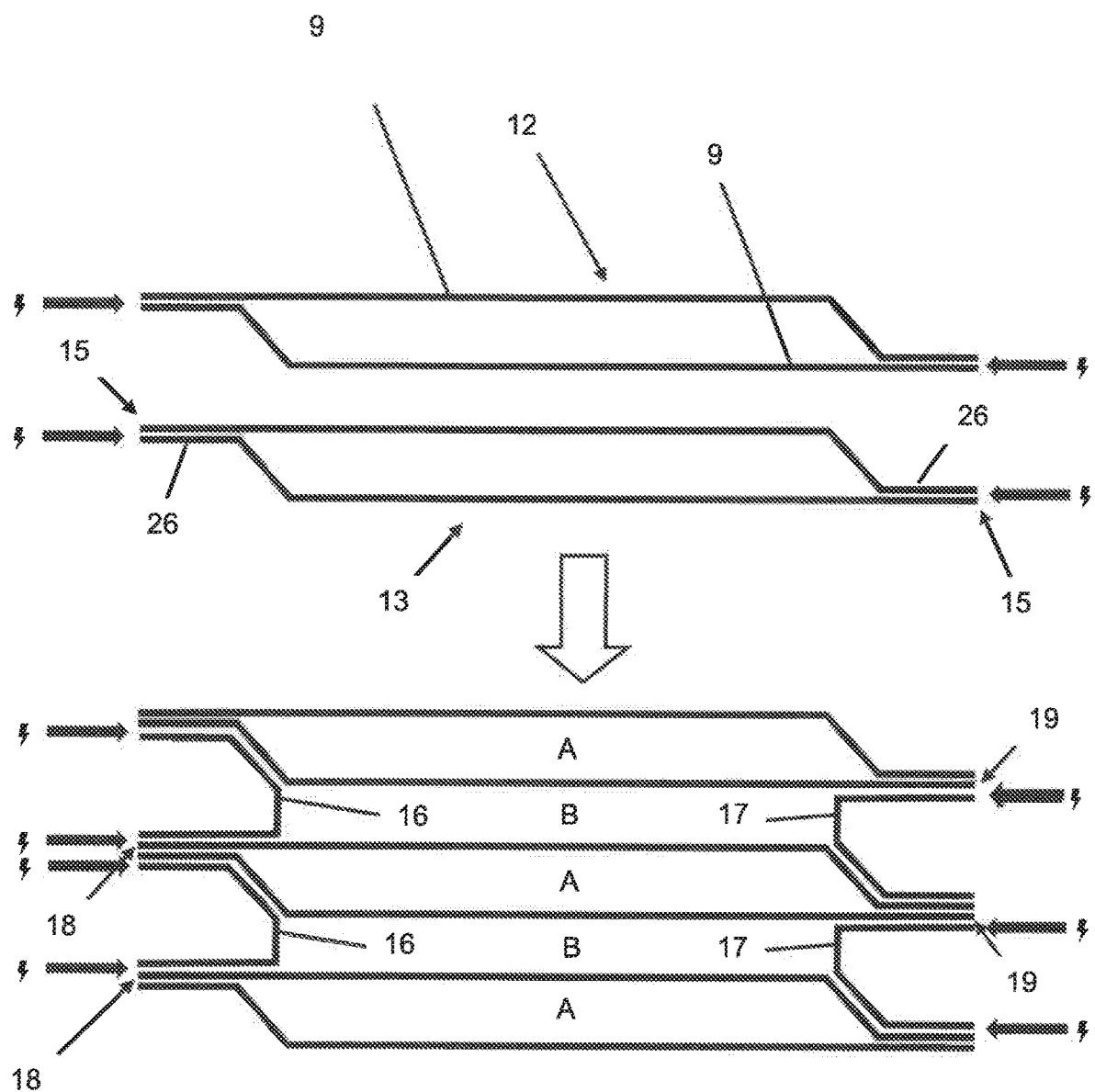
FIG. 14 a formation of plate pairs and a plate stack according to the first embodiment of the method of the disclosure using individual plates according to FIG. 13.

FIGS. 13 and 14 show a schematic representation of a further embodiment of the method according to the disclosure for manufacturing a plate heat exchanger according to the first embodiment.

FIG. 13 shows a flat metal sheet 5 in a side view. By applying a force in the direction of the surface normal to the edge region 8 adjacent to a longitudinal edge 7 of the metal sheet 5, the edge region of the metal sheet 5 is bent by the bending angle α. In the present case, the bending process is continued until the bending angle α of 30° to 50°, preferably 35°, 40°, 45° or 50°, in the present case 45°, is reached.

The intermediate result of the bending process is a metal sheet 5 which is bent at one end. The metal sheet 5 has a remaining flat surface part 10 and a seam 11 extending at an angle of 135° to the surface part 10.

To improve the mechanical stability of the resulting plate stack 14 and to simplify welding, an edge region 24 of the seam 11 of the metal sheet 5 is bent along its free marginal edge 25 extending in the longitudinal direction in order to create a contact surface 26 with at least one adjacent individual plate. The edge region 24 extends between the free marginal edge 25 and the dotted line running perpendicular to the seam 11.

In the present case, the seam 11 is bent in the opposite direction to the first seam in relation to the respective surface normal of the edge regions 8 or 25. Furthermore, bending is carried out at an identical bending angle α' between 30° and 50°, preferably 35°, 40°, 45° or 50°, in this case 45°. The bending angle α' therefore corresponds to the bending angle α of the first fold. This results in an individual plate 9 with a flat surface part 10 and a seam 11, the seam having a contact surface 26 that extends away from the remaining flat surface part 10 in the same direction.

Plate pairs 12, 13 according to the first embodiment are first formed a shown in FIG. 14 from the individual plates 9 according to FIG. 13.

For this purpose, two individual plates 9, each in the form of one of the previously bent metal sheets, are arranged one on top of the other in the stacking direction of the later plate stack 14 and welded together. With reference to the image plane, the stacking direction of the plate stack 14 corresponds to the height direction.

The two individual plates 9 are turned towards each other with their respective contact surfaces 26, so that a contact surface 26 of one individual plate 9 is assigned to a free marginal edge 15 of the other individual plate 9 and the two individual plates 9 are welded together along their respective contact surfaces 26 and the free marginal edges 15 cooperating therewith.

In the next step, as shown in FIG. 14, the welded plate pairs 12, 13 are joined together to form a plate stack 14 with two spacers 16, 17 interposed. At least two plate pairs 12, 13 are arranged one on top of the other in the stacking direction of the later plate stack 14 and welded together. For this purpose, the two plate pairs 12, 13 are arranged one on top of the other with the interposition of a first spacer 16 extending along a first longitudinal edge 18 and a second spacer 17 extending along a second longitudinal edge 19. The spacers 16, 17 are then welded to the adjacent plate pairs 12, 13. In the present case, the longitudinal edges 18, 19 are formed by the respective free marginal edges 15.

In the present case, the spacers 16, 17 are in the form of rod-shaped profiles with a complex cross-section. A spacer 16, 17 is obtained by a three times bending in the same direction with reference to the respective surface normal. The spacers 16, 17 are formed from the same material as the metal sheets 5. Preferably, the spacers 16, 17 are previously formed from a metal sheet 5 by cutting and bending. The metal sheet is first bent by 90°. The resulting first seam is bent by 45°. The resulting second seam is bent again by 45°. The bending edges of the spacer are spaced apart from each other and their position in the cross-section of the spacer is adapted to the cross-section of the plate pairs 12, 13 that are intended to be directly adjacent in the plate stack. The adaptation is carried out in such a way that the spacers 16, 17 have a contour corresponding to the cross-section of the parts of the respective plate pairs 12, 13 to be welded, at least in sections.

The shape of the individual plates 9 with the contact area 26 extending away from the flat surface part 10 and their special arrangement make welding much easier. This is because the connecting regions between the contact area 26 and the free marginal edge 15 for forming the plate pairs on the one hand and between the spacers 16, 17 and the free marginal edge 15 on the other hand extend away from the plate stack and are therefore more easily accessible for welding tools. In addition, by the selection of the angles α and α', a comparatively low overall height per flow channel is obtained. As a result, the number of flow channels can be increased for a given plate stack height, which increases the efficiency of the plate heat exchanger.

FIG. 15 shows a schematic representation of a further embodiment of the method according to the disclosure for manufacturing a plate heat exchanger according to the first embodiment.

Individual plates 9 produced from metal sheets 5 in accordance with FIG. 11 are provided with conical metal elements 27. The length of the metal elements 27 is chosen in the present case in such a way that it essentially corresponds to the distance between two adjacent individual plates 9 or two adjacent plate pairs 12, 13. In this way, arching of the respective flat surface part 10 can be completely prevented. The metal elements 27 therefore act as spacers.

In the present case, the conical metal elements 27 are designed in the form of a truncated cone. The metal elements 27 each have a base surface 28 at one end and a top surface 29 at the other end. Circumferentially, the conical metal elements have a circumferential lateral surface 30 which connects the base surface and the top surface.

The conical metal elements 27 are each welded with their base surface 28 onto the flat surface part 10 of an individual plate 9. In the present case, the individual plates 9 are only fitted with conical metal elements 27 at one side of the surface part 10, but may also be fitted with conical metal elements 27 at both sides. According to the process control of the first embodiment of the method of the disclosure, if the individual plates are fitted with metal elements at one side and if only identical individual plates are used, this will lead to that the metal elements 27 are only arranged in flow channels which are formed between individual plates or between plate pairs 12, 13. In contrast, if identical individual plates 9 are used, fitting the individual plates with metal elements at both sides makes it possible to realize an arrangement of metal elements 27 in flow channels which are formed between individual plates 9 and between plate pairs 12, 13. Welding the base surface 28 exclusively to the surface part 10 is generally sufficient, so that additional weldings of the top surface 28 can be omitted.

Furthermore, in this embodiment, a relative displacement between the individual plates 9 and/or the plate pairs 12, 13 as a result of a temperature-induced material movement for instance is possible, so that material stresses are avoided in an advantageous manner.

The invention claimed is:

1. A method of manufacturing a plate heat exchanger from a plurality of individual plates joined together to form a plate stack having a stacking direction, the method at least comprising the following method steps:

providing metal sheets having flat large surfaces, forming individual plates by bending each of the metal sheets exclusively along one marginal edge running in a longitudinal direction, whereby a seam running in the longitudinal direction is formed per metal sheet and a free unbent marginal edge running in the longitudinal direction is retained opposite of the seam, forming a plate pair by arranging two individual plates, each in the form of one of the previously bent metal sheets, one on top the other in the stacking direction of a later plate stack and welding the previously bent metal sheets together, the two individual plates being turned towards each other with their respective seams in such a way that the seam of the first individual plate is assigned to the free unbent marginal edge of the second individual plate and that the seam of the second individual plate is assigned to the free unbent marginal edge of the first individual plate and the two individual plates being welded together along their respective seams and the free marginal unbent edges cooperating therewith, and forming a plate stack by arranging at least two plate pairs one on top of the other in the stacking direction of the later plate stack and welding the at least two plate pairs together, the two plate pairs being arranged one on top the other with the interposition of a first spacer extending along a first longitudinal edge and a second spacer extending along a second longitudinal edge, and the spacers being welded together with the respective plate pairs adjacent thereto, wherein at least two first flow channels for a first medium and at least one second flow channel for a second medium are being formed, wherein each first flow channel is formed between the two individual plates of each plate pair and the second flow channel is being formed between the two plate pairs and the first and the second spacer, arranged between the two plate pairs, whereby two opposite and longitudinally extending side walls of the second channel are formed by the first and the second spacer respectively, wherein the elongate spacers are used which have at least one of an L-shaped cross-section, a C-shaped cross-section and a complex cross-section.

2. The method according to claim 1, wherein the spacers are used which are at least partially formed from austenitic stainless steel.

3. The method according to claim 1, wherein part of the seams of the individual plates produced by bending are bent at least one more time along their free marginal edges running in the longitudinal direction to form a contact surface with adjacent individual plates.

4. The method according to claim 1, wherein a plurality of conical metal elements are arranged between at least one of adjacent individual plates and adjacent plate pairs, a length of the metal elements being chosen in such a way that corresponds to a distance between two adjacent individual plates or two adjacent plate pairs.

5. The method according to claim 4, wherein the conical metal elements are welded with their base surface onto a flat large surface of an individual plate.

6. The method according to claim 5, wherein the plurality of conical metal elements is welded in regular distribution partly onto one and partly onto the other flat large surface of the individual plates facing each other.

\* \* \* \* \*